United States Patent [19]

Satoh et al.

[11] Patent Number: 4,848,299
[45] Date of Patent: Jul. 18, 1989

[54] SYSTEM AND METHOD FOR CONTROLLING AN IGNITION TIMING FOR AN INTERNAL COMBUSTION ENGINE

[75] Inventors: Hiroshi Satoh, Stanford, Calif.; Toshimi Abo, Kanagawa, Japan

[73] Assignee: Nissan Motor Company, Limited, Japan

[21] Appl. No.: 183,716

[22] Filed: Apr. 19, 1988

[30] Foreign Application Priority Data

May 22, 1987 [JP] Japan .................................. 62-125275

[51] Int. Cl.⁴ ............................................... F02P 5/14
[52] U.S. Cl. ..................................... 123/425; 123/417; 123/435
[58] Field of Search ............... 123/425, 435, 416, 406, 123/417

[56] References Cited

U.S. PATENT DOCUMENTS

| | | | |
|---|---|---|---|
| 4,640,249 | 2/1987 | Kawamura et al. | 123/425 |
| 4,706,628 | 11/1987 | Trowbley | 123/435 |
| 4,711,212 | 12/1987 | Haraguchi et al. | 123/435 |
| 4,732,126 | 3/1988 | Ikeura et al. | 123/435 |
| 4,745,902 | 5/1988 | Yagi et al. | 123/435 |

FOREIGN PATENT DOCUMENTS

| | | | |
|---|---|---|---|
| 54-116525 | 9/1979 | Japan | 123/425 |
| 58-82074 | 5/1983 | Japan | 123/425 |

Primary Examiner—Raymond A. Neill
Attorney, Agent, or Firm—Lowe, Price, Leblanc, Becker & Shur

[57] ABSTRACT

A system and method for controlling an ignition timing for an internal combustion engine, in which a basic ignition timing angle determined according to an engine operating condition is corrected according to an MBT (Minimum Spark Angle for Best Torque) correction quantity within a range of a predetermined limited value set for the MBT correction quantity, and the ignition timing angle is corrected within the predetermined limit range on the basis of one of knock correction quantity (calculated for suppressing the knock correction quantity to fall in a predetermined level) and the MBT correction quantity (calculated for correcting the instantaneous ignition timing angle so that a maximum internal cylinder pressure coincides with a target angular position at which a magnitude of engine output torque becomes maximum) which is placed at a more retardation angle side.

12 Claims, 5 Drawing Sheets

INTAKE
(NEGATIVE − 400 mmHg)
PRESSURE

INTAKE
(NEGATIVE − 50 mmHg)
PRESSURE

SYSTEM AND METHOD FOR CONTROLLING AN IGNITION TIMING FOR AN INTERNAL COMBUSTION ENGINE

BACKGROUND OF THE INVENTION (1) Field of the Invention

The present invention relates to a system and method for controlling an ignition timing for an internal combustion engine. More specifically, the present invention relates to the system and method therefor, in which an engine knocking occurred in the engine is suppressed and simultaneously an MBT (Minimum Spark Advance For Best Torque) control is carried out so that an engine driveability is increased.

(2) Background of the Art

It is necessary to determine an ignition timing of an internal combustion engine according to an engine operating condition so that the engine is driven at optimum.

In general, it is a best way to ignite fuel supplied to the engine at a timing in a vicinity of a minimum advance angle while achieving a maximum engine torque, so called MBT, with an efficiency and fuel consumption of the engine taken into account. An MBT control such that the ignition timing is changed to MBT according to the engine operating condition has been carried out in almost engines.

However, an engine knocking occurs in a certain engine operating condition when an igniting timing advance angle is transferred to a more advance angle side and thereby a stable engine driving cannot be achieved.

A Japanese Patent Application First (Unexamined) Publication No. sho 58-82074 published on May 17, 1983 and U.S. Pat. No. 4,640,249 issued on Feb. 3, 1987 exemplifies the ignition timing controlling systems, in which a knocking control operation of controlling the ignition timing according to a presence or absence of the engine knocking is carried out in combination with the above-described MBT control operation.

In the ignition timing controlling systems disclosed in the above-identified Japanese Patent Application Publication and United States Patent, a pressure(s) in a combustion chamber(s) of an engine cylinder(s) (hereinafter referred to as an internal cylinder pressure) is detected and the ignition timing is controlled in the MBT control mode in such a way that a crank angle at which the internal cylinder pressure becomes maximum (hereinafter referred to as an internal cylinder pressure maximum timing) $\theta_{pmax}$ is placed at a predetermined angular position at which a magnitude of a generation torque of the engine becomes maximum.

In addition, at the same time, the engine knocking is detected by means of a signal processing circuit on the basis of the same detected signal indicative of the internal cylinder pressure. When the knocking level exceeds a predetermined value, the ignition timing is controlled toward a retardation angle side to avoid recurrence of the engine knocking (knocking suppressive control) with a higher priority than the MBT control. Furthermore, when the knocking has once been suppressed, the ignition timing is again controlled in the MBT control mode so that the magnitude of the engine generation torque becomes maximum. In this way, the magnitude of engine generation torque is made as large as possible along with the suppression of the engine knocking recurrence so that the engine driveability is improved.

However, in the ignition timing controlling system in the above-identified Japanese Patent Application Publication, whenever the knocking occurs, the knocking suppressive control is uniformly carried out with the higher priority than the MBT control. On the other hand, when the knocking does not occur, the MBT control causes the ignition timing to be corrected. When the knocking occurs, a correction angle quantity in the MBT control mode is fixed and the ignition timing is corrected to retard the ignition timing. Therefore, since in a case when the engine knocking has not occurred after the correction of the ignition timing toward the retardation angle side by means of the knocking control under some engine operating condition, the correction of the ignition timing toward an advance angle side is immediately executed by means of MBT control and thus an effect of avoiding the recurrence of the engine knocking is often lost.

To avoid such an situation as described above, if with the MBT control fixed for a predetermined interval of time after the occurrence of knocking, the engine operating condition abruptly changes, an angular point of the ignition timing angle in the MBT control mode is placed at the more retardation angle side. In this situation, a responsive characteristic of the MBT control is worsened and the effect of increasing the engine generation torque is reduced.

SUMMARY OF THE INVENTION

It is, therefore, an object of the present invention to provide a system and method for controlling an ignition timing for an internal combustion engine which improve a fuel consumption and engine driveability under respective engine operating conditions.

It is another object of the present invention to provide the system and method therefor in which a correction quantity of an ignition timing angle for suppressing the recurrence of engine knocking and an MBT correction quantity for achieving the MBT control are independently calculated, a predetermined limit value is set to these correction quantities, and the ignition timing is corrected on the basis of one of the correction quantities which is placed at a more retardation angle side within the limited range so that no recurrence of engine knocking can be assured under all engine operating conditions and an effective MBT control to achieve the maximum engine torque driving in a range of no occurrence of knocking under each engine operating condition.

The above-described objects can be achieved by providing a system for controlling an ignition timing for an internal combustion engine, comprising: (a) first means for detecting occurrence of engine knocking; (b) second means for detecting an internal pressure in an engine cylinder; (c) third means for detecting an engine operating condition; (d) fourth means for setting a basic ignition timing angle according to the engine operating condition detected by the fourth means; (e) fifth means for detecting an engine crankshaft angular displacement at which the internal cylinder pressure becomes maximum as a maximum internal cylinder timing angle on the basis of a detection result of the second means; (f) sixth means for calculating a knock correction quantity for correcting the instantaneous ignition timing angle so as to suppress a level of the knocking within a predetermined level on the basis of a detection result of the first means; (g) seventh means for calculating an MBT correction quantity for correcting the instantaneous ignition timing angle so that the maximum internal cylinder pressure timing angle coincides with a target angular position at which a magnitude of engine output torque becomes maximum; (h) eighth means for setting a predetermined limit value for at least one of the calculated knock and MBT correction quantities whose value is smaller than that of the other correction quantity as an ignition timing correction quantity; (i) ninth means for correcting the basic ignition timing angle according to the instantaneous ignition timing correction quantity within a range of the predetermined limit value set by the eighth means and correcting the basic ignition timing angle on the basis of one of the knock and MBT correction quantities which is placed at a more retardation angle side; and (j) tenth means for determining the instantaneous ignition timing angle from the corrected basic ignition timing angle by the ninth means and igniting fuel supplied to the engine at the determined ignition timing.

The above-described objects can also be achieved by providing a system for controlling an ignition timing for an internal combustion engine, comprising: (a) first means for detecting occurrence of engine knocking; (b) second means for detecting an internal pressure in an engine cylinder; (c) third means for detecting an engine operating condition; (d) fourth means for setting a basic ignition timing angle according to the engine operating condition detected by the fourth means; (e) fifth means for detecting an engine crankshaft angular displacement at which the internal cylinder pressure becomes maximum as a maximum internal cylinder timing on the basis of a detection result of the second means; (f) sixth means for calculating a knock correction quantity for correcting the instantaneous ignition timing so as to suppress a level of the knocking within a predetermined level on the basis of a detection result of the first means; (g) seventh means for calculating an MBT correction quantity for correcting the instantaneous ignition timing angle so that the maximum internal cylinder pressure timing angle coincides with a target angular position at which a magnitude of engine output torque becomes maximum; (h) eighth means for setting a predetermined limit value for each of the calculated knock and MBT correction quantities whose value is smaller than that of the other correction quantity as an ignition timing correction quantity; (i) ninth means for correcting the basic ignition timing angle according to the instantaneous ignition timing correction quantity within a range of the predetermined limit value set by the eighth means and correcting the basic ignition timing angle on the basis of one of the knock and MBT correction quantities which is placed at a more retardation angle side; and (j) tenth means for determining the instantaneous ignition timing angle from the corrected basic ignition timing angle by the ninth means and igniting fuel supplied to the engine at the determined ignition timing.

The above-described objects can also be achieved by providing a method for controlling an ignition timing for an internal combustion engine, comprising the steps of: (f) calculating a knock correction quantity for correcting the instantaneous ignition timing angle so as to suppress the engine knocking to fall in a predetermined level on the basis of a detection result of the step (a); (g) calculating an MBT correction quantity for correcting the instantaneous ignition timing so that the maximum internal cylinder pressure timing coincides with a target angular position at which a magnitude of an engine output torque becomes maximum; (h) setting a predetermined limit value for at least one of the calculated knock and MBT correction quantities; (i) correcting the basic ignition timing angle according to the MBT correction quantity within a range of the predetermined limit value set by the eighth means and correcting the basic ignition timing angle on the basis of one of the knock and MBT correction quantities which is placed at a more retardation angle side; and (1) determining the instantaneous ignition timing from the corrected basic ignition timing angle carried out in the step (i) and igniting fuel supplied to the engine at the determined ignition timing angle.

DETAILED DESCRIPTION OF THE PREFERRED EMBODIMENTS

Reference will hereinafter be made to the drawings in order to facilitate understanding of the present invention.

FIGS. 1 to 9 show a preferred embodiment of an engine ignition timing controlling system according to the present invention.

Figure 1:
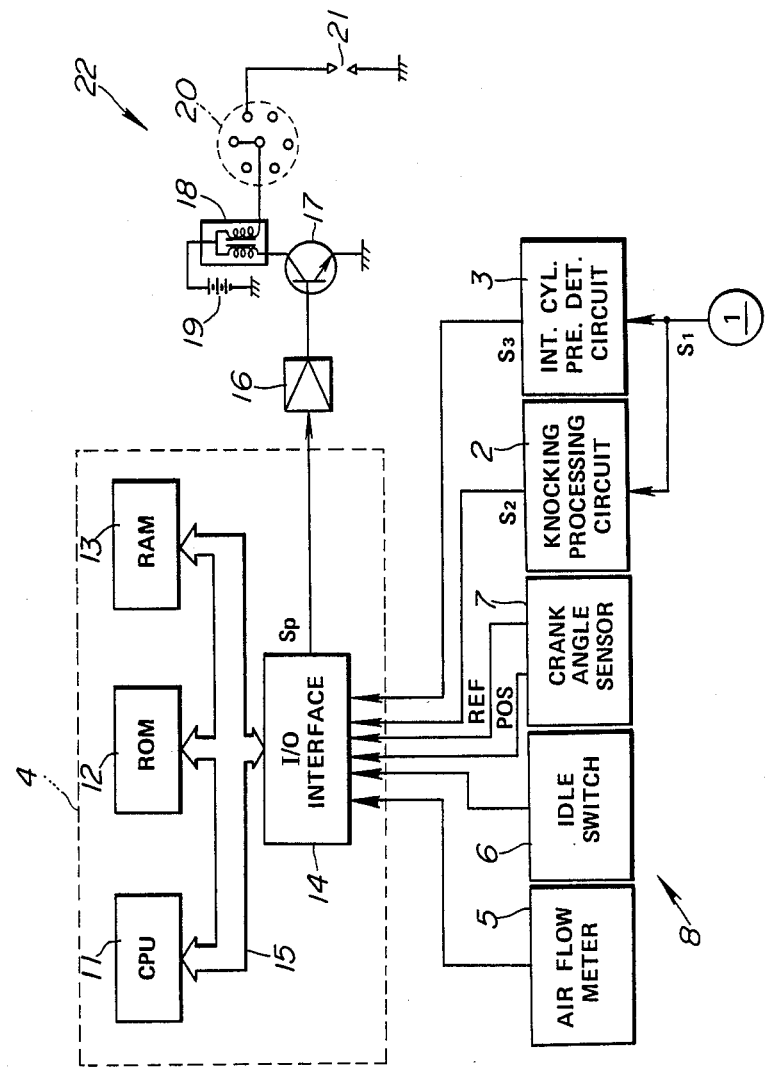
FIG. 1 is a schematic circuit diagram of a system for controlling an ignition timing for an internal combustion engine in a preferred embodiment according to the present invention.

FIG. 1 shows a whole construction of the engine ignition timing controlling system in the first preferred embodiment.

In FIG. 1, an internal pressure responsive sensor 1 converts a combustion pressure in a cylinder into an electric charge by means of a piezoelectric element thereof and outputs an electric charge signal $S_1$ according to a magnitude of the combustion pressure. The internal pressure responsive sensor 1 is specifically formed of a washer of an ignition plug screwed to a cylinder head of the engine. The washer shaped internal pressure responsive sensor 1 is fixed to the ignition plug and cylinder head by means of a fastening portion of the ignition plug. The output signal of the internal cylinder pressure responsive sensor 1 is inputted to a knocking processing circuit 2 and internal cylinder pressure detecting circuit 3. The knocking processing circuit 2 includes a band pass filter enabling a passage of only high frequency components of the pressure indicative signal $S_1$ which are predominantly included in the signal $S_1$ from the internal pressure responsive sensor 1 and a wave shaping circuit half-wave rectifying the high frequency components, forming an envelope signal from the half-wave rectified signal, and outputting a knocking signal $S_2$ corresponding to the knocking level.

The internal cylinder pressure detecting circuit 3 includes a charge amplifier and a low-pass filter. The output signal $S_1$ of the internal cylinder pressure sensor 1 is electric charge-voltage converted by means of the charge amplifier to provide the electrical signal. The low-pass filter extracts signal components only below a predetermined cutoff frequency (e.g., about 1 kHz) from the voltage signal to eliminate the high frequency components and outputs a signal $S_3$ to be processed to a control unit 4.

The structures of the knocking signal processing circuit 2 and internal cylinder detecting circuit 3 are exemplified by a U.S. patent application Ser. No. 749,478 filed on Jan. 27, 1985 and a U.S. Pat. No. 4,640,249 issued on Feb. 3, 1987, the disclosures of which are hereby incorporated by reference.

An airflow quantity $Q_a$ of the intake air is detected by an airflow meter 5. An engine idling state is detected by means of an idle switch 6 installed at a throttle valve of the engine. In addition, an engine revolutional angle, i.e., a crank angle of the engine is detected by means of a crank angle sensor 7. The crank angle sensor 7 outputs a reference signal REF in a pulse form when a predetermined position, e.g., BTDC 70° before a top dead center (TDC) in an explosion stroke of each engine cylinder for each explosion stroke (120 degrees in the case of a six-cylinder engine and 180 degrees in the case of a four-cylinder engine) and outputs a unit angular signal POS whenever the engine revolves through a unit angle, e.g., 1°. The engine revolutional speed N is detected by means of the crank angle sensor 7. The airflow meter 5 and crank angle sensor 7 constitute engine driving state detecting means 8. The engine driving state detecting means 8 and idle switch 6 output information signals to the control unit 4. The control unit 4 carries out the ignition timing control on the basis of these input informations. The control unit 4 includes a CPU (Central Processing Unit) 11, ROM (Read Only Memory) 12, RAM (Random Access Memory) 13, and an I/O interface 14. These circuits elements are interconnected via a common bus 15. The I/O interface 14 receives signals from the respective sensors and outputs an ignition signal $S_P$ to a power transistor 17 via an amplifier 16. When the amplified ignition signal is received at a base of the power transistor 17 (in the case of FIG. 1, when a power supply to the power transistor is interrupted), the power transistor 17 is turned off so that a primary current to an ignition coil 18 is interrupted from a battery 19 so that a high surge pulse Pi is generated. The high surge pulse Pi is supplied and distributed to the ignition plug 21 of each cylinder. The output signal amplifier 16, power transistor 17, ignition coil 18, battery 19, distributor 20, and ignition plug 21 constitute ignition means 22.

An operation of the preferred embodiment of the ignition timing controlling system will be described below.

Figure 2:
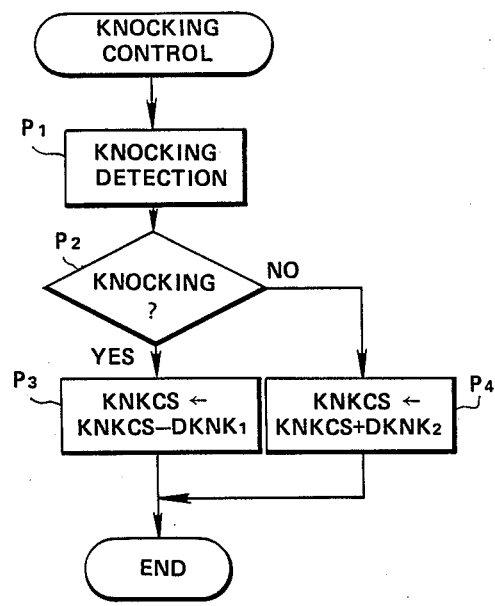
FIG. 2 is a processing flowchart of a knocking control executed in the system shown in FIG. 1.

First, FIG. 2 shows a program flowchart executed in the control unit 4 for a knocking control. The program shown in FIG. 2 is executed for each predetermined interval of time.

In a step $P_1$, the control unit 4 detects an occurrence of the engine knocking.

Specifically, on the basis of data derived by processing the output signal $S_2$ of the knocking processing circuit 2, the occurrence of knocking is detected by means of a knocking signal processing program (not shown) activated at a predetermined crank angle position having the same period as the reference signal period. In the knocking signal processing program, an activation flag is set whenever it is activated. When the activation flag is set, the control unit 4 determines the occurrence of knocking. The activation flag is cleared. Furthermore, when the activation flag is cleared, the control unit 4 determines that no knocking occurs.

It is noted that the knocking detecting method is exemplified by a Japanese Patent Application First (Unexamined) Publication No. sho 54-116525 published on Sept. 10, 1979, other Japanese Patent Application Publications, and U.S. Pat. Nos. 4,660,249 issued on Apr. 28, 1987 and 4,640,249 issued on Feb. 3, 1987. The disclosures of the two U.S. patents are hereby incorporated by reference.

Next in a step $P_2$, the control unit 4 determines whether the engine knocking occurs.

When the knocking occurs (Yes), the routine goes to a step $P_3$ in which a knock correction quantity KNKCS is corrected to a retardation angle side by a predetermined angle $DKNK_1$ in accordance with an equation (1). When no knocking occurs, the routine goes to a step $P_4$ in which the knock correction quantity KNKCS is corrected toward an advance angle side by a predetermined angle $DKNK_2$ in accordance with an equation (2).

$$KNKCS = KNKCS' - DKNK_1 \tag{1}$$

$$KNKCS = KNKCS' + DKNK_2 \tag{2}$$

In the two equations (1) and (2), KNKCS'=a previous value of KNKCS.

Figure 3:
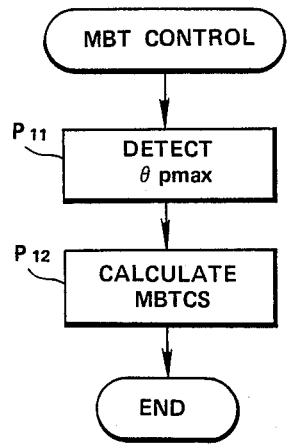
FIG. 3 is a processing flowchart of an MBT control executed in the system shown in FIG. 1.

FIG. 3 shows a flowchart of a program of an MBT (Minimum Spark Advance for Best Torque) control. This program is activated at the same period as that of the reference signal REF.

In FIG. 3, in a step $P_{11}$, the control unit 4 detects a crank angle (internal cylinder pressure maximum timing $\theta_{pmax}$) at a time when the internal cylinder pressure s reaches the maximum value from the data group processed (A/D conversion) for each unit angle on the basis of the signal $S_3$ of the internal pressure detecting circuit 3. In a step $P_{12}$, the control unit 4 calculates an MBT correction quantity MBTCS in accordance with an equation (3) and the routine is ended.

It is noted that the detection of $\theta_{pmax}$ is exemplified by a U.S. Pat. No. 4,660,535 and U.S. Pat. No. 4,640,249 exemplify the MBT control procedures, both of disclosures of which are hereby incorporated by reference.

$$MBTCS = MBTCS' + K(\theta_{pmax} - \theta) \tag{3}$$

In the equation (3), MBTCS', previous value of MBTCS once before the present processing, K: a constant number below one (constant fragment number), and $\theta$: a target position of the MBT control (a crank angle at which the engine generation torque becomes maximum, for example, the crank angle is set of a predetermined value in a range from ATDC 10 degrees to 20 degrees).

Figure 4:
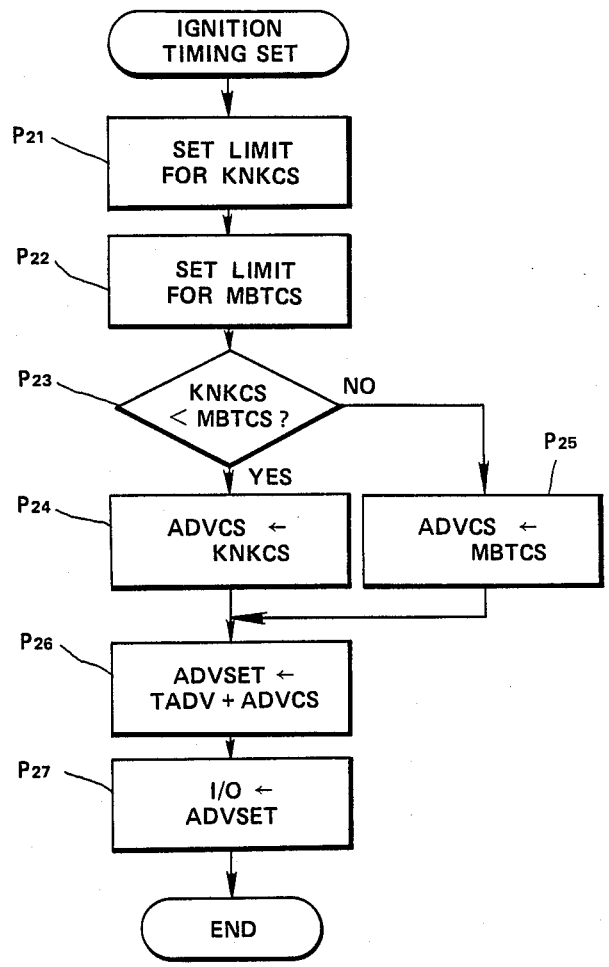
FIG. 4 is a processing flowchart of an ignition timing control executed in the system shown in FIG. 1.

FIG. 4 shows a flowchart of a program of an ignition timing control procedure executed in the control unit 4.

The program shown in FIG. 4 is executed once for each predetermined interval of time in synchronization with the reference signal REF.

In a step $P_{21}$, the control unit 4 sets maximum and minimum limits for the knock correction quantity KNKCS calculated in the processing flowchart shown in FIG. 2.

Then, the routine goes to a step $P_{22}$ in which the control unit 4 sets maximum and minimum limits for the MBT correction quantity calculated in the processing flowchart shown in FIG. 3.

It is noted that both maximum limits of the knock and MBT correction quantities and both minimum limits of the knock and MBT correction quantities are respectively the same values.

In the next step $P_{23}$, the control unit 4 compares magnitudes of KNKCS and MBTCS.

If KNKCS<MBTCS (Yes) in the step $P_{23}$, the routine goes to a step $P_{24}$ in which the ignition timing correction quantity ADVCS is set to KNKCS. If KNKCS>or=MBTCS (No) in the step $P_{24}$, the routine goes to a step $P_{25}$ in which ADVCS-MBTCS.

Hence, since one of the knock and MBT correction quantities which is placed toward the retardation angle side is selected as the ignition timing correction quantity, both of which being independently calculated, such a state as in the previously proposed ignition timing controlling systems in which when the knocking occurs, the control is uniformly transferred from the MBT control to the knocking suppression control can be avoided. Therefore, even if the value of the MBTCS is smaller than that of the KNKCS, (i.e., the ignition timing set in the MBT control mode is placed toward the more retardation angle side), the MBT control can be maintained. In a step $P_{26}$, the control unit 4 calculates an actual ignition timing setting value (final ignition timing) ADVSET in accordance with the following equation (4). In a step $P_{30}$, (70°-ADVSET) is set in a register of an I/O interface 14 on the basis of the calculated ADVSET.

The ignition signal $S_P$ is outputted at a predetermined ignition timing and the present processing has been ended.

$$ADVSET=TADV+ADVCS \qquad (4)$$

In the equation (4), TADV denotes a basic ignition timing (TADV is looked up from a map representing ignition timing advance angles determined on the basis of input values of the engine revolution speed N, intake air quantity $Q_a$, cooling water temperature $T_w$)

In the way described above, the knock correction quantity KNKCS for preventing the recurrence of the knock and MBT correction quantity MBTCS are mutually calculated independently of each other. Then, one of both knock correction quantity KNKCS and MBT correction quantity MBTCS which is placed at a more retardation angle side is selected as the ignition timing correction quantity ADVCS. The maximum and minimum limits for both correction quantities are set.

Hence, the control of knocking suppression is always effectively achieved under all engine operating conditions and the MBT control can effectively be achieved in the range of no knocking occurrence. In addition, the MBT control operation can be achieved without occurrence of the knock under all engine operating conditions. Consequently, it becomes possible to execute the maximum torque driving under each engine operating condition. The engine driveability can be achieved with the improvement in fuel consumption and the operating performance under each engine operating condition. In addition, since both maximum and minimum limits are set for the respective correction quantities, the reduction of generation of engine torque and disadvantages of the occurrence of knocking due to the excessive advance or retardation of the ignition timing angle can be avoided under every engine operating condition. Furthermore, such a situation that excessive corrections for the knocking suppression and MBT correction are carried out more than necessary, thus affection inadvertently other control operations in engines (fuel consumption, exhaust emissions) can be prevented. Consequently, performance of the ignition controlling system can be improved.

It is noted that the maximum and minimum limits for both correction quantities are previously determined to provide optimum values from many experiments.

The effects achieved in the preferred embodiment will be described with reference to FIGS. 5 to 9.

Figure 5:
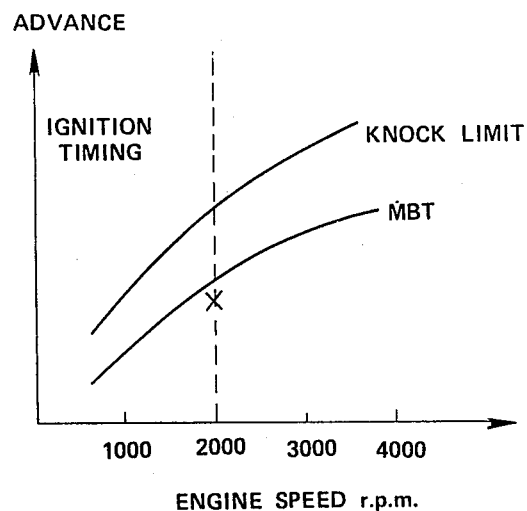
FIG. 5 is a characteristic graph representing a relationship between the MBT controlled ignition timing when an intake negative pressure in an intake air passage indicates $-400$ mmHg and the ignition timing at a knock limit point and an engine revolution speed.
Figure 6:
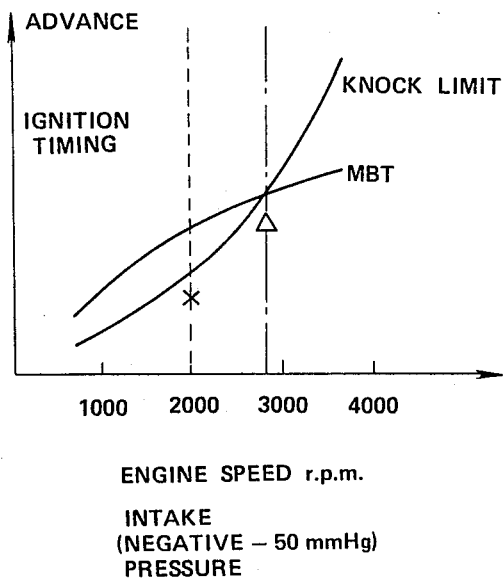
FIG. 6 is a characteristic graph representing a relationship between the MBT controlled ignition timing and knocking limit ignition timing when the intake negative pressure indicates $-50$ mmHg and an engine revolution speed.

FIGS. 5 and 6 show relationships of the engine revolution speed-versus-MBT ignition timing and the knocking limit when the intake negative pressure indicates constant in the same engine. The intake negative pressures are −400 mmHg and −50 mmHg, respectively.

Figure 7:
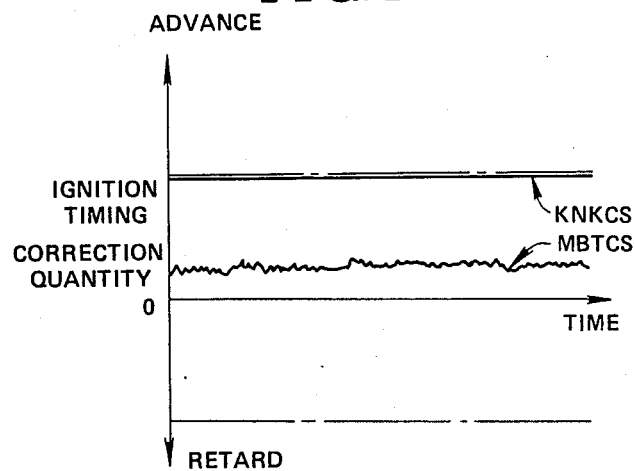
FIGS. 7 and 8 are timing charts indicating movements of the knocking correction quantity and MBT correction quantity with respect to time.

As shown in a dot-and-dash line of FIG. 5, the basic ignition timing TADV is placed at a position x in FIG. 5 with the intake negative pressure indicating −400 mmHg and the engine speed indicating 2000 R.P.M. At this time, the trajectories of both KNKCS and MBTCS are shown in FIG. 7.

In this case, since MBTCS<KNKCS (KNKCS at this time indicate the maximum limit), the MBTCS is used as the ADVCS so that the maximum torque driving becomes possible.

In addition, as shown in a dot line of FIG. 6, the basic ignition timing TADV is placed on a point X shown in FIG. 6 under the engine operating condition, i.e.,· the intake negative pressure indicating −50 mmHg and the engine revolution speed indicating 2000 R.P.M.

Figure 8:
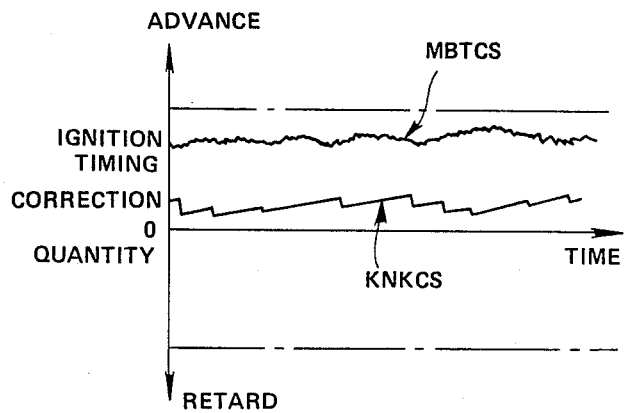

The trajectories of the knock correction value and MBT correction value are shown in FIG. 8 when the basic ignition timing angle TADV is placed on the point X, the intake negative pressure indicates −50 mmHg, and the engine revolution speed indicates 2000 R.P.M.

Since, at this time, KNKCS<MBTCS, KNKCS is used as the ignition timing correction quantity so that the engine driving at the knock limit can be achieved.

Figure 9:
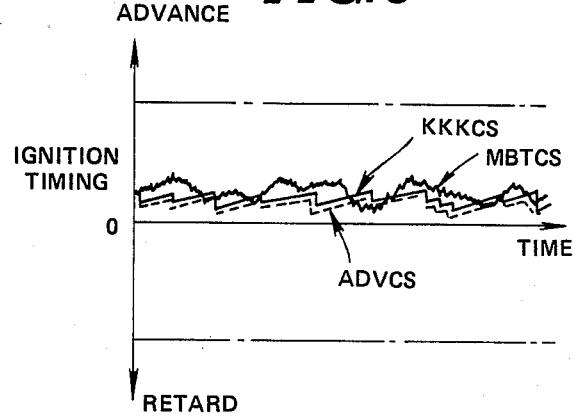
FIG. 9 is a characteristic graph representing movements of the knock correction quantity for preventing the recurrence of the knocking and MBT controlled correction quantity with respect to time when the engine operating condition is varied.

Furthermore, the engine driving is carried out at 2000 R.P.M. as shown in a dot-and-dash line of FIG. 6, the basic ignition timing TADV is placed on a point * shown in FIG. 6. The trajectory of MBTCS as ADVCS is shown in FIG. 9. Since, in this case, the correction quantity of the more retardation angle side at each ignition timing setting time is used as the actual ignition timing correction quantity ADVCS (refer to a dot line of FIG. 9), the engine driving at the maximum torque becomes possible without occurrence of the knocking.

In the preferred embodiment, the maximum and minimum limit values are provided for each correction quantity and the ignition timing angle is corrected on the basis of the correction quantity at the more retardation angle side. Therefore, thye optimum ignition timing can be carried out under each engine operating condition and the fuel consumption and engine output can remarkably be improved.

It is noted that the setting processings of the maximum and minimum limits for the knock and MBT correction quantities KNKCS and MBTCS are carried out in the program shown in FIG. 4. However, the maximum and minimum limits for both correction quantities may be set in the program shown in FIGS. 2 and 3.

The maximum limits and minimum limits may be set to mutually different values. Furthermore, only the maximum or minimum limit(s) may be set.

In addition, the ignition timing controlling system and method according to the present invention may be applied to the system in which the engine knocking and MBT controls are independently carried out for each engine cylinder. The structure of the above-described independent ignition timing controlling system is exemplified in a U.S. patent application Ser. No. 749,478 filed on June 27, 1985 (now allowed), the disclosure of which is hereby incorporated by reference.

As described hereinabove, since, in the engine ignition timing controlling system and method according to the present invention, the ignition timing correction quantity for the knocking suppression control and MBT correction quantity for the MBT control are independently calculated, predetermined limit values are set for these correction quantities, the ignition timing is corrected on the basis of one of the correction quantities which is placed at a more retardation angle side within the range of the limit values, the occurrence of engine knocking can be avoided under all engine operating conditions and the MBT control can effectively be achieved within the range in which no knocking occurs. In addition, the maximum torque driving is made possible under each engine driving condition. The fuel consumption and driveability of the engine can be improved.

It will fully be appreciated from those skilled in the art that the foregoing description is made in terms of the preferred embodiment and various changes and modifications may be made without departing from the scope of the present invention which is to be defined by the appended claims.

What is claimed is:

1. A system for controlling an ignition timing for an internal combustion engine, comprising:
    (a) first means for detecting occurrence of engine knocking;
    (b) second means for detecting an internal pressure in an engine cylinder;
    (c) third means for detecting an engine operating condition;
    (d) fourth means for setting a basic ignition timing angle according to the engine operating condition detected by the third means;
    (e) fifth means for detecting an engine crankshaft angular displacement at which the internal cylinder pressure becomes maximum as a maximum internal cylinder pressure timing angle on the basis of a detection result of the second means;
    (f) sixth means for calculating a knock correction quantity for correcting the instantaneous ignition timing angle so as to suppress a level of the knocking within a predetermined level on the basis of a detection result of the first means;
    (g) seventh means for calculating an MBT correction quantity for correcting the instantaneous ignition timing angle so that the maximum internal cylinder pressure timing angle coincides with a target angular position at which a magnitude of engine output torque becomes maximum;
    (h) eighth means for setting a predetermined limit value for at least one of the calculated knock and MBT correction quantities whose value is smaller than that of the other correction quantity as an ignition timing correction quantity;
    (i) ninth means for correcting the basic ignition timing angle according to the instantaneous ignition timing correction quantity within a range of the predetermined limit value set by the eighth means and correcting the basic ignition timing angle on the basis of one of the knock and MBT correction quantities which is placed at a more retardation angle side; and
    (j) tenth means for determining the instantaneous ignition timing angle from the corrected basic ignition timing angle by the ninth means and igniting fuel supplied to the engine at the determined ignition timing.

2. A system as set forth in claim 1, wherein the eighth means sets maximum and minimum predetermined limits for the values of the knock correction quantity calculated by the sixth means and the MBT correction quantity calculated by the seventh means.

3. A system as set forth in claim 2, wherein the maximum limits of both knock and MBT correction quantities and the minimum limits of both knock and MBT correction quantities have the same values, respectively.

4. A system as set forth in claim 2, wherein the maximum limits of both knock and MBT correction quantities and minimum limits of both knock and MBT correction quantities have different values, respectively.

5. A system as set forth in claim 1, wherein the first means sets a maximum predetermined limit for at least one of the knock and MBT correction quantities.

6. A system as set forth claim 1, wherein the first means includes a pressure responsive sensor for sensing the internal pressure in a single engine cylinder.

7. A system as set forth in claim 1, wherein the first means includes a plurality of pressure responsive sensors for sensing the internal pressures in the plurality of engine cylinders.

8. A system as set forth in claim 7, wherein the first means detects the engine knocking occurrence for each cylinder.

9. A system as set forth in claim 8, wherein the sixth means calculates the instantaneous knock correction quantity toward the retardation angle side by the predetermined value when the engine knocking exceeding the predetermined level occurs in the corresponding cylinder.

10. A system as set forth in claim 7, wherein the sixth means calculates the knock correction quantity toward an advance angle side by another predetermined value when the magnitude of the engine knocking does not exceed the predetermined level.

11. A system for controlling an ignition timing for an internal combustion engine, comprising:
    (a) first means for detecting occurrence of engine knocking;
    (b) second means for detecting an internal pressure in an engine cylinder;

(c) third means for detecting an engine operating condition;
(d) fourth means for setting a basic ignition timing angle according to the engine operating condition detected by the third means;
(e) fifth means for detecting an engine crankshaft angular displacement at which the internal cylinder pressure becomes maximum as a maximum internal cylinder pressure timing on the basis of a detection result of the second means;
(f) sixth means for calculating a knock correction quantity for correcting the instantaneous ignition timing so as to suppress a level of the knocking within a predetermined level on the basis of a detection result of the first means;
(g) seventh means for calculating an MBT correction quantity for correcting the instantaneous ignition timing angle so that the maximum internal cylinder pressure timing angle coincides with a target angular position at which a magnitude of engine output torque becomes maximum;
(h) eighth means for setting a predetermined limit value for each of the calculated knock and MBT correction quantities whose value is smaller than that of the other correction quantity as an ignition timing correction quantity;
(i) ninth means for correcting the basic ignition timing angle according to the instantaneous ignition timing correction quantity within a range of the predetermined limit value set by the eighth means and correcting the basic ignition timing angle on the basis of one of the knock and MBT correction quantities which is placed at a more retardation angle side; and
(j) tenth means for determining the instantaneous ignition timing angle from the corrected basic ignition timing angle by the ninth means and igniting fuel supplied to the engine at the determined ignition timing.

12. A method for controlling an ignition timing for an internal combustion engine, comprising the steps of:
(a) detecting an occurrence of engine knocking;
(b) detecting an internal pressure in an engine cylinder of the engine;
(c) detecting an engine operating condition;
(d) setting a basic ignition timing according to the engine operating condition;
(e) detecting a crankshaft angular displacement at which the internal cylinder pressure becomes maximum as a maximum internal cylinder timing on the basis of the detection result in the step (b);
(f) calculating a knock correction quantity for correcting the instantaneous ignition timing angle so as to suppress the engine knocking to fall in a predetermined level on the basis of a detection result of the step (a);
(g) calculating an MBT correction quantity for correcting the instantaneous ignition timing so that the maximum internal cylinder pressure timing coincides with a target angular position at which a magnitude of an engine output torque becomes maximum;
(h) setting a predetermined limit value for at least one of the calculated knock and MBT correction quantities;
(i) correcting the basic ignition timing angle according to the MBT correction quantity within a range of the predetermined limit value set by the eighth means and correcting the basic ignition timing angle on the basis of one of the knock and MBT correction quantities which is placed at a more retardation angle side; and
(l) determining the instantaneous ignition timing from the corrected basic ignition timing angle carried out in the step (i) and igniting fuel supplied to the engine at the determined ignition timing angle.

* * * * *